US008055264B2

(12) United States Patent
Yao et al.

(10) Patent No.: US 8,055,264 B2
(45) Date of Patent: Nov. 8, 2011

(54) METHOD AND APPARATUS FOR CONTROLLING HANDOFF

(75) Inventors: Zhonghui Yao, Shenzhen (CN); Wenguang Lan, Shenzhen (CN); Yu Liu, Shenzhen (CN); Jing Li, Shenzhen (CN); Wenhui Zhou, Beijing (CN); Yuhong Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 614 days.

(21) Appl. No.: 11/778,360

(22) Filed: Jul. 16, 2007

(65) Prior Publication Data
US 2007/0268859 A1 Nov. 22, 2007

Related U.S. Application Data

(63) Continuation of application No. PCT/CN2006/000053, filed on Jan. 13, 2006.

(30) Foreign Application Priority Data

Jan. 14, 2005 (CN) .......................... 2005 1 0002132

(51) Int. Cl.
*H04W 36/00* (2009.01)
(52) U.S. Cl. ........................ 455/436; 370/328; 455/439
(58) Field of Classification Search .................. 370/331, 370/338, 332, 329; 455/436, 438, 437, 442
See application file for complete search history.

(56) References Cited

U.S. PATENT DOCUMENTS

| 6,275,703 | B1* | 8/2001 | Kalev ............................ 455/436 |
| 6,985,465 | B2 | 1/2006 | Cervello et al. |
| 2002/0060995 | A1* | 5/2002 | Cervello et al. ............... 370/332 |
| 2003/0162535 | A1* | 8/2003 | Nishiyama et al. ........... 455/422 |
| 2004/0146035 | A1* | 7/2004 | Lee et al. ....................... 370/338 |
| 2004/0219926 | A1* | 11/2004 | Kim et al. ................... 455/452.2 |
| 2004/0224690 | A1* | 11/2004 | Choi et al. ..................... 455/436 |
| 2004/0264414 | A1 | 12/2004 | Dorenbosch |
| 2005/0070285 | A1* | 3/2005 | Goransson ..................... 455/436 |
| 2005/0089010 | A1* | 4/2005 | Rue et al. ....................... 370/349 |
| 2005/0124344 | A1* | 6/2005 | Laroia et al. .................. 455/436 |
| 2005/0136845 | A1* | 6/2005 | Masuoka et al. ........... 455/67.14 |

FOREIGN PATENT DOCUMENTS

CN 1510879 A 7/2004

* cited by examiner

*Primary Examiner* — Nick Corsaro
*Assistant Examiner* — Mahendra Patel
(74) *Attorney, Agent, or Firm* — Leydig, Voit & Mayer, Ltd.

(57) ABSTRACT

Disclosed is a method for controlling handoff by a network infrastructure, which includes collecting channel information and transmitting the channel information to a Mobile Terminal (MT) and a method for controlling handoff by a MT, which includes receiving channel information collected by a network infrastructure and making a handoff decision according to the channel information. The present invention also discloses apparatuses for controlling handoff. Applying the present invention, the handoff decision will be made based on both the information collected by the network infrastructure and the information collected by the MT, therefore blind handoff is reduced, the network workloads are balanced and the QoS is assured before and after the handoff.

13 Claims, 4 Drawing Sheets

METHOD AND APPARATUS FOR CONTROLLING HANDOFF

This application is a continuation of International Patent Application No. PCT/CN2006/000053, filed Jan. 13, 2006, which claims priority to Chinese Patent Application No. 200510002132.9, filed Jan. 14, 2005, all of which are hereby incorporated by reference.

FIELD OF THE TECHNOLOGY

The present invention relates to wireless communication technologies, and particularly, to methods and apparatuses for controlling handoff.

BACKGROUND OF THE INVENTION

IEEE 802.11 standards have been developed as the standards for Wireless Local Area Network (WLAN) and are widely supported and applied; meanwhile the demands for a large scale enterprise network, a large community network or even a Metropolitan Area Network (MAN) are brought forward. In a large WLAN, a great number of Access Points (APs) have to be deployed, each of which covers a specified area, to provide a large continuous coverage. Hence it is required that a Mobile Terminal (MT) shall be able to perform a handoff from one AP to another AP while moving around in the continuous coverage and still maintains service continuity. The basic handoff flow of an MT includes the following steps.

1) The MT scans wireless channels. The MT measures indexes of the wireless channels, e.g., the signal intensity, while scanning the wireless channels. Then the MT performs a handoff from one AP to another AP based on the measured indexes. For example, the MT may choose the channel with the best wireless channel quality as the destination AP in the handoff process.

2) The MT initiates a reassociation request. Having received the reassociation request initiated by the MT, the destination AP has to enable the system to delete the association between the MT and the origination AP, which was established before the handoff. Then the destination AP establishes a new association with the MT.

3) The data services of the MT are forwarded by the destination AP after the new association has been established. Meanwhile, the MT continues to scan and measure indexes of other wireless channels to determine whether it is necessary to perform a handoff to a new destination AP, and to determine the new destination AP when a handoff is needed.

Conventionally, the WLAN supports streaming media, voice services as well as common data services. When the MT performs a handoff, it is necessary to minimize the influence on the services caused by the handoff, and basic requirements on handoff include that:

a) the handoff period should be short enough so that the services will not be interrupted;

b) the quality of service (QoS) after the handoff should be better than the QoS before the handoff.

When a WLAN includes multiple APs in the network and an MT performs a handoff from one AP to another AP, there are two ways to perform the access control on the network infrastructure which include a distributive access control and a centralized access control.

As shown in FIG. 1, in a distributive access control which is performed by APs, the handoff of the MT from one AP to another AP is performed via exchanging information between the two APs. The IEEE 802.11f which is recommended by the IEEE P802 Working Group defines a protocol framework for the communication between APs, i.e., Inter-AP Protocol (IAPP), based on which the inter-AP handoff of the MT can be performed. The protocol defines the inter-AP interaction process involved in the association or reassociation of the MT with an AP. Furthermore, a Radius server for IAPP service is added into the infrastructure to ensure a safe communication between APs, which requires the APs to implement Radius protocol after being powered on and to register at the Radius server. An AP can look up the IP addresses of a corresponding AP on the Radius server by using the Basic Service Set Identification (BSSID) of the AP and starts IP layer based communication with the AP with security information from the Radius server. IEEE 802.11f adds extensions to the Radius protocol in order to support the functions.

As shown in FIG. 2, some manufacturers have brought forth a lightweight AP system architecture, i.e., some of the functions of Media Access Control (MAC) on the AP are centralized in a exchange, usually referred to as Wi-Fi exchange or a router, usually referred to as Access Router on an upper layer. The IETF CAPWAP Working Group divides the centralized WLAN into three types of architectures: Remote MAC, SPLIT MAC and Local MAC, in which the Wi-Fi exchange or the Access Router on the upper layer are generally referred to as an Access Controllers (ACs). In the Remote MAC architecture all MAC functions of an AP are transferred to the AC; in the SPLIT MAC architecture the MAC functions which are not sensitive to time are transferred to the AC; and in the Local MAC architecture the MAC functions are still performed by an AP, but managed by an AC. The lightweight AP equals SPLIT MAC architecture and related manufacturers have released a Lightweight AP Protocol (LWAPP) to IETE.

The most prominent advantage of the centralized architecture is that the APs can be managed and controlled in a centralized manner by an AC, especially in the inter-AP handoff process of the MT, in which the APs need not to communicate with each other directly, but to interact with the AC only. In an LWAPP based architecture, the control frames on the MAC layer of the air interface, e.g., the association request and reassociation request, are handled by the AC directly, therefore the access control in the handoff process is performed inside the AC entity.

In either the distribution system or the centralized system, the handoff decision in the WLAN is made by the MT according to the signal intensity collected by the MT, and the MT needs to scan all channels, which requires a long time, hence the conventional handoff scheme in which the MT scans all channels and makes handoff decision without considering other indexes of the channels may result in a low QoS e.g., congestion at an AP which causes a low QoS or even malfunctions including service unavailable or service interruption.

SUMMARY OF THE INVENTION

The embodiments of the present invention provide methods and apparatuses for controlling handoff to solve the problem which influences the quality of services that mobile stations make handoff decisions based on the information collected by the MT only.

A method for controlling handoff by a network infrastructure includes:
collecting channel information; and
transmitting the channel information to a Mobile Terminal (MT) which makes a handoff decision according to the channel information.

A method for controlling handoff by a Mobile Terminal (MT) includes:
receiving channel information collected by a network infrastructure; and
making a handoff decision according to the channel information.

A network infrastructure for controlling handoff includes:
a collecting module, for collecting channel information; and
a transmitting module, for transmitting the channel information to a Mobile Terminal (MT).

A network infrastructure for controlling handoff includes:
an Access Points (AP), for monitoring channels to obtain channel monitor data, and transmitting the channel monitor data to a Mobile Terminal (MT); and
an Access Controller (AC), for generating and maintaining a neighboring channel list, transmitting the neighboring channel list to the MT.

A mobile terminal for controlling handoff includes:
a receiving module, for receiving channel information collected by a network infrastructure; and
a handoff module, for making a handoff decision according to the channel information.

According to embodiments of the present invention, the handoff decision will be made based on both the information collected by the network infrastructure and the information collected by the MT, therefore blind handoff is reduced, the network workloads are balanced and the QoS is assured before and after the handoff.

Moreover, since only neighboring channels are scanned, the time needed for the channel scan is reduced and the handoff process is speeded up.

DETAILED DESCRIPTION OF THE INVENTION

An embodiment of the present invention collects information of each channel on a network infrastructure and transmits the information to a Mobile Terminal (MT), which will then make handoff decision based on both the information collected by the MT and the information collected by the network infrastructure in a handoff process. The information of the channel collected by the network infrastructure includes a neighboring channel list of each channel, i.e., neighboring channel set, the workload and the QoS support capability of each channel, the sensitivity and the transmission power of each channel on the network infrastructure. The neighboring channel list of a channel includes the information of all the channels that cover neighboring or overlapping areas of the coverage of the channel.

Figure 3A:
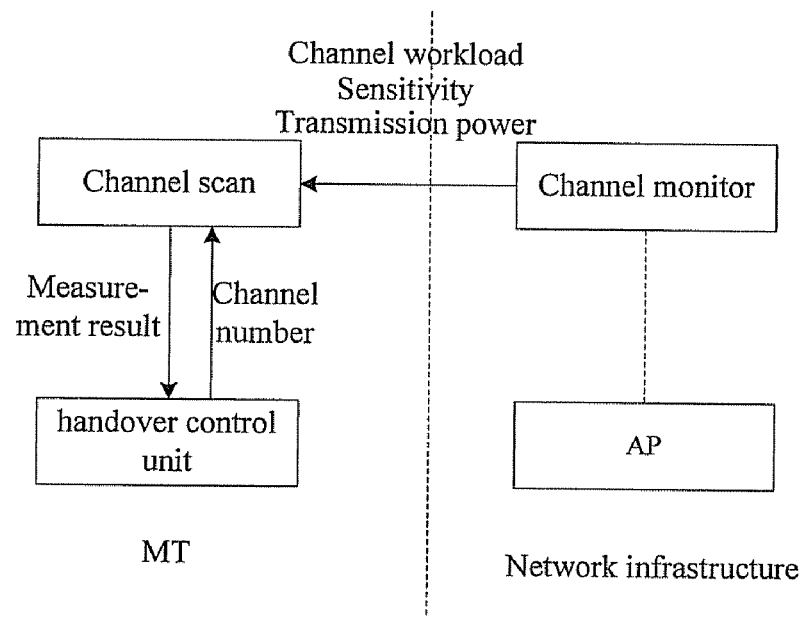
FIGS. 3A, 3B and 3C are schematic diagrams illustrating a WLAN in accordance with an embodiment of the present invention.

As shown in FIG. 3A, a channel monitor is added in the network infrastructure of the LAN, which is used for monitoring the channels of at least one AP and obtaining channel monitor data. The channel monitor data includes channel workload, sensitivity and transmission power of the channels. The channel workload indicates the capacity of a channel and the workload of the channel at present, including a total number of online users that can be supported by the channel, a total bandwidth of the channel, maximum user numbers that can be supported for different service types, and the number of online users. The service types are defined according to different categories of QoS standards. The channel monitor also monitors the working status of the channels, including malfunction alarms and failures.

The MT may scan the channels in two modes: an active scan mode and a passive scan mode. In the active scan mode, the MT sends a Probe Request frame and waits for an AP to return a Probe Response. In the passive scan mode, the MT listens to a Beacon broadcast frame sent by an AP. The channel monitor data collected by the network infrastructure are transmitted to the MT via the Probe Response or/and Beacon frame.

When an AP broadcasts a Beacon frame or sends a Probe Response to the MT, the AP acquires channel monitor data including channel workload, sensitivity and transmission power from the channel monitor. And the channel monitor data is transmitted to the MT via the Beacon frame or the Probe Response. Therefore the handoff control unit of the MT considers not only parameters including the signal intensity and Signal to Noise Ratio (SNR), but also factors including channel workload, sensitivity and transmission power on the AP before making a handoff decision, therefore an AP congestion caused by the handoff of massive MTs to one AP can be prevented.

Figure 3B:
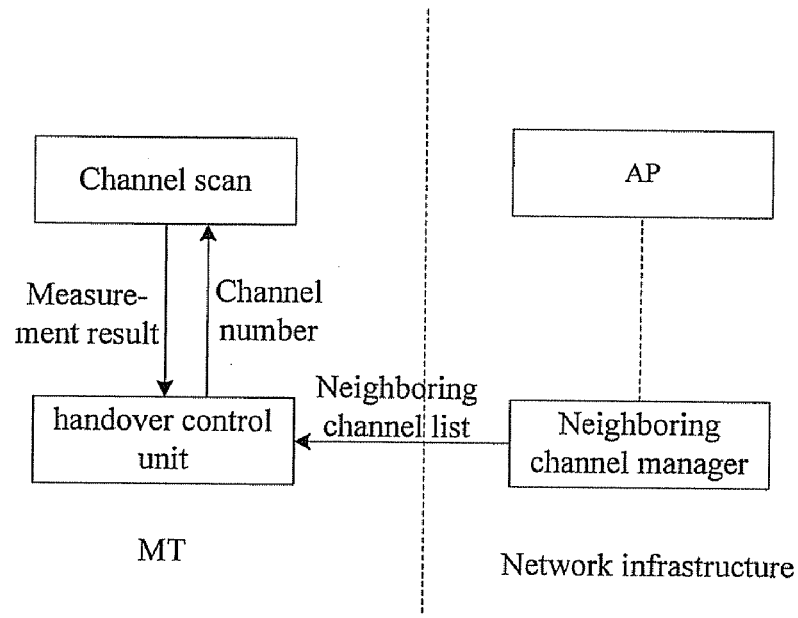

As shown in FIG. 3B, a neighboring channel manager is added on the network infrastructure of the LAN, used for generating and maintaining the neighboring channel lists of every channel, and transmitting the neighboring channel lists to the MT via the AP. An entry in a neighboring channel list includes the channel type and the channel number or the center frequency of the channel. The channel type indicates the physical layer protocol followed by the channel, e.g., 802.11b channel, 802.11g channel, 802.11a channel, 802.11n channel and non-standard distinctive channel types defined by manufacturers.

The generation of a neighboring channel list relies on the neighborhood of channels and the channel attributes. Two neighboring channels indicate that the coverage of the two channels is overlapping. The channel attribute includes static information or includes static and dynamic information of a channel. The static information includes the channel type, the channel number and the center frequency of the channel, etc. The dynamic information includes the data collected by the channel monitor: normal workload, sensitivity and transmission power or channel malfunction indication, e.g., failure, alarm, and etc. The neighboring channel list transmitted to the MT includes the neighboring channels that function normally. The neighborhood of channels and the static information in the channel attributes can be configured by an administrator according to a network plan or be configured automatically with a network tool.

When the MT is associated with an AP, the AP transmits corresponding neighboring channel list to the handoff control unit of the MT via an association response frame. The handoff control unit initiates channel scan periodically to scan channels in the neighboring channel list. Hence the handoff control unit of the MT scans the channels in the neighboring channel list only and the time required by the channel scan is shortened.

When the MT does not receive any neighboring channel list in the association response frame, the MT will scan all valid channels.

Figure 3C:
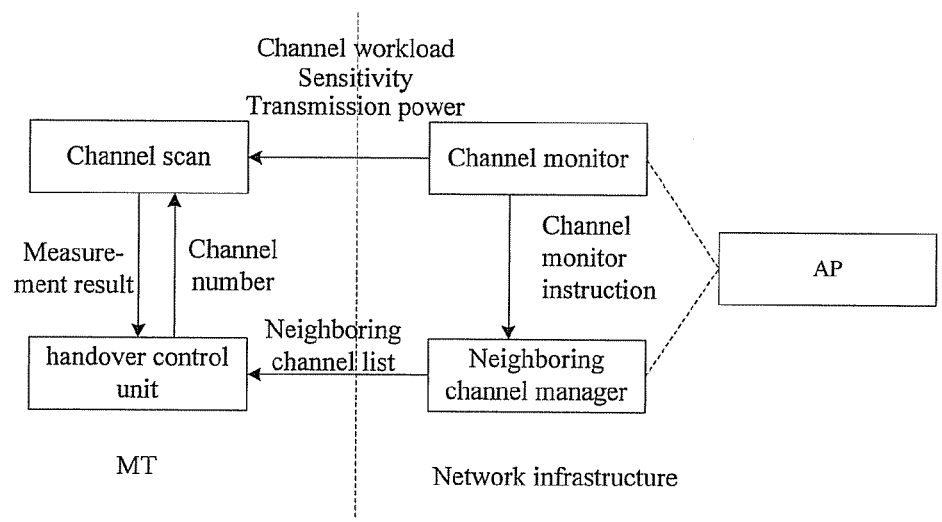

As shown in FIG. 3C, a channel monitor and a neighboring channel manager are added on the network infrastructure of the LAN. The neighboring channel manager maintains the neighboring channel lists of all channels in a centralized manner and the channel monitor monitors the channel workload, sensitivity and transmission power of the air interface channels at APs to obtain the channel monitor data. An entry in a neighboring channel list may include the channel monitor data on the network infrastructure as well as the channel type and the channel number or the center frequency of the channel.

The neighboring channel manager may interrogate for the channel monitor data collected by the channel monitor or require the channel monitor to report the collected channel monitor data periodically. If a channel malfunctions or fails, the channel monitor shall report to the neighboring channel manager immediately.

On the MT, the handoff control unit makes a handoff decision, obtains a new neighboring channel list from the network when the MT performs a handoff to a new channel at an AT, and saves the new neighboring channel list. The handoff control unit initiates channel scan periodically to scan channels in the neighboring channel list. While scanning channels, the MT may obtain the channel information collected by the channel monitor on the network infrastructure including channel workload, sensitivity and transmission power. The channel monitor sends a channel monitor indication which carries channel status information to the neighboring channel manager, the channel status information including the channel workload, sensitivity and transmission power of the channels when the channels function normally and the malfunction information related to the channels. Then the neighboring channel manager updates channel attributes according to the information.

In the architecture shown in FIG. 3C, since the MT scans only the channels in the neighboring channel list instead of all potential valid channels, the time required by the channel scan in the handoff process is reduced. Moreover, in the channel scan, the MT may obtain the workload of the scanned channels on the network infrastructure as well as conventional information including signal intensity and SNR, therefore the handoff decision unit of the MT may consider all the information on the network infrastructure to make a best choice while making a handoff decision.

Figure 4A:
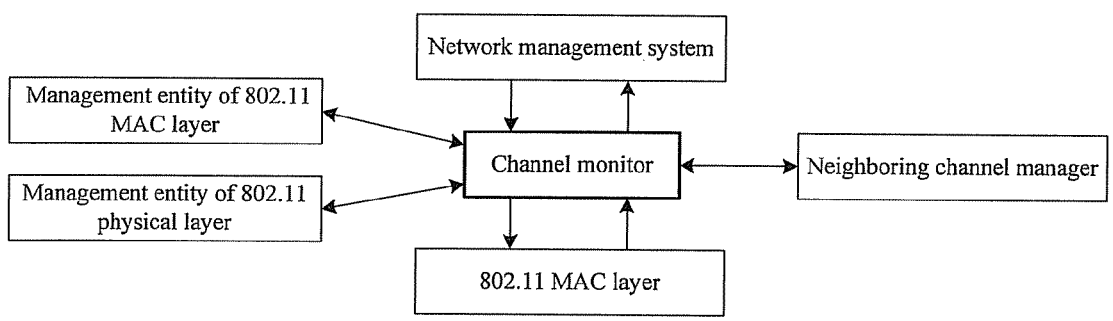
FIG. 4A is a block diagram illustrating a basic theory of a channel monitor in accordance with an embodiment of the present invention.

FIG. 4A shows a block diagram illustrating a basic theory of a channel monitor provided by the present invention. The channel monitor has interfaces to the 802.11 MAC layer, the management entity of the physical layer, the network management system and the neighboring channel manager respectively. When Simple Network Management Protocol (SNMP) is adopted as the network management interface protocol, the network management system may interact with the channel monitor via the SNMP to configure the parameters of the channel monitor and obtain the channel monitor data of corresponding channels in the channel monitor. The parameters and the monitor information are saved in the channel monitor as management information base (MIB). The parameters of the channel monitor include a total number of online users that can be supported by a channel, a total bandwidth of a channel, maximum user numbers that can be supported by a channel for different service types, and the number of online users of a channel. The service types are defined according to different categories of QoS standards.

The channel monitor may directly access the management entity of the 802.11 MAC layer and the MIB of the management entity of the physical layer to obtain the physical parameters and MAC layer parameters of corresponding channel, e.g., sensitivity, transmission power, associated user (STA) number and service types. Parameters of the management entity of the 802.11 MAC layer and the management entity MIB of the physical layer can also be configured to measure correspond channel. When the MT scans the channels, the channel monitor transmits the information of corresponding channels through 802.11 MAC layer to the MT via a Beacon frame or Probe Response frame which carrying the information of corresponding channels.

Figure 4B:
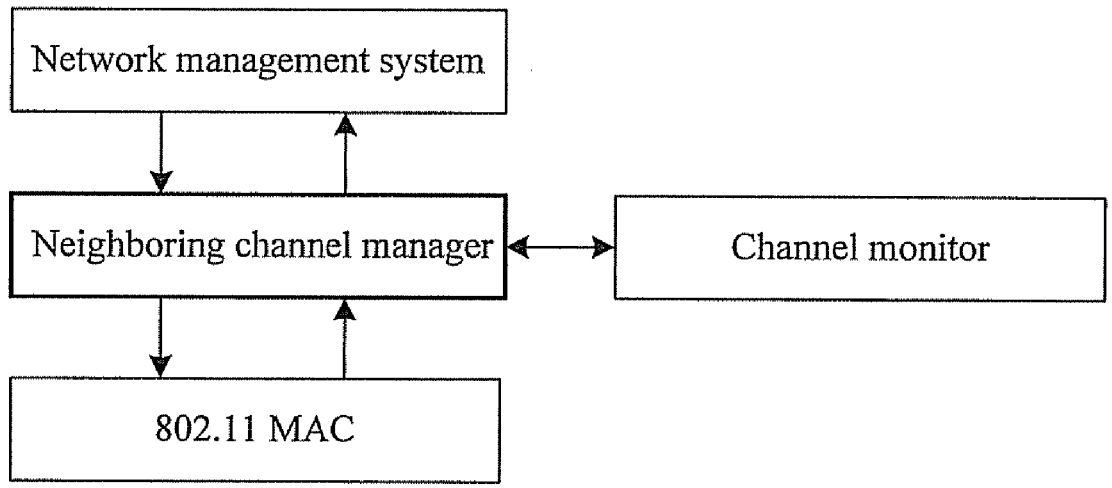
FIG. 4B is a block diagram illustrating a basic theory of a neighboring channel manager in accordance with an embodiment of the present invention.

FIG. 4B shows a block diagram illustrating a basic theory of a neighboring channel manager which manages the neighboring channel lists of all channels. The neighboring channel lists of all channels are configured by the network management system respectively according to network plan or are generated by an automatic tool in the network planning process. The neighboring channel manager may also obtain corresponding information of the channels from the channel monitor at real time. When the MT scans the channels, the neighboring channel manager transmits the neighboring channel lists of corresponding channels through 802.11 MAC layer to the MT via an association response frame.

In the architecture shown in FIGS. 3A and 3C, the MT may consider both the information collected by the MT and the channel monitor data only when determining whether it is necessary to perform a handoff, or only when determining the destination AP in a handoff process; obviously, the best choice would be that the MT considers both the information collected by the MT and the channel monitor data when determining whether it is necessary to perform a handoff and when determining the destination AP in a handoff process.

Figure 1:
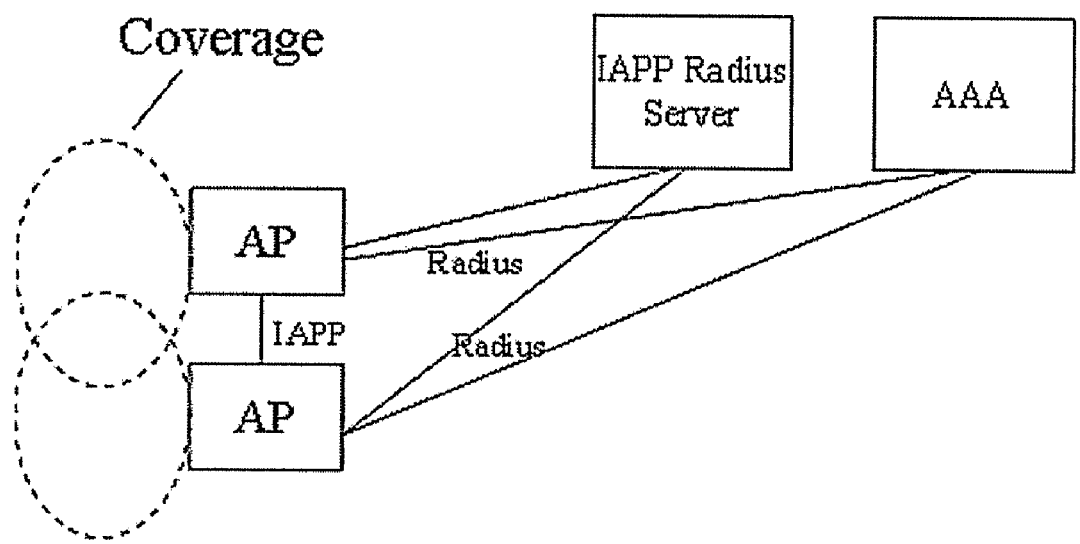
FIG. 1 is a schematic diagram illustrating a conventional distribution system of LAN.
Figure 2:
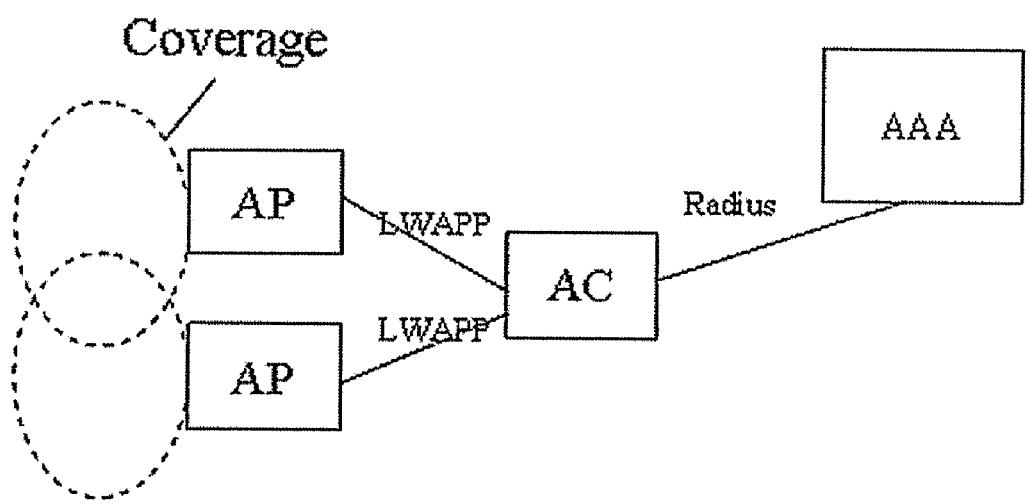
FIG. 2 is a schematic diagram illustrating a conventional centralized system of LAN.

In a distribution system as shown in FIG. 1, the channel monitor and the neighboring channel manager can be installed in an AP. In a centralized system as shown in FIG. 2, the channel monitor is installed in an AP and the neighboring channel manager is installed in an Access Controller (AC); or the channel monitor and the neighboring channel manager are both installed in an AC. The channel monitor and the neighboring channel manager in the embodiments of the present invention are both channel information collecting apparatuses.

When the MT sends an association request or a reassociation request to an AP, the association response frame or reassociation response frame will carry the neighboring channel list of the channel to be associated or reassociated with, and the MT extracts the neighboring channel list from the association response frame or reassociation response frame for the handoff control unit of the MT.

Figure 5:
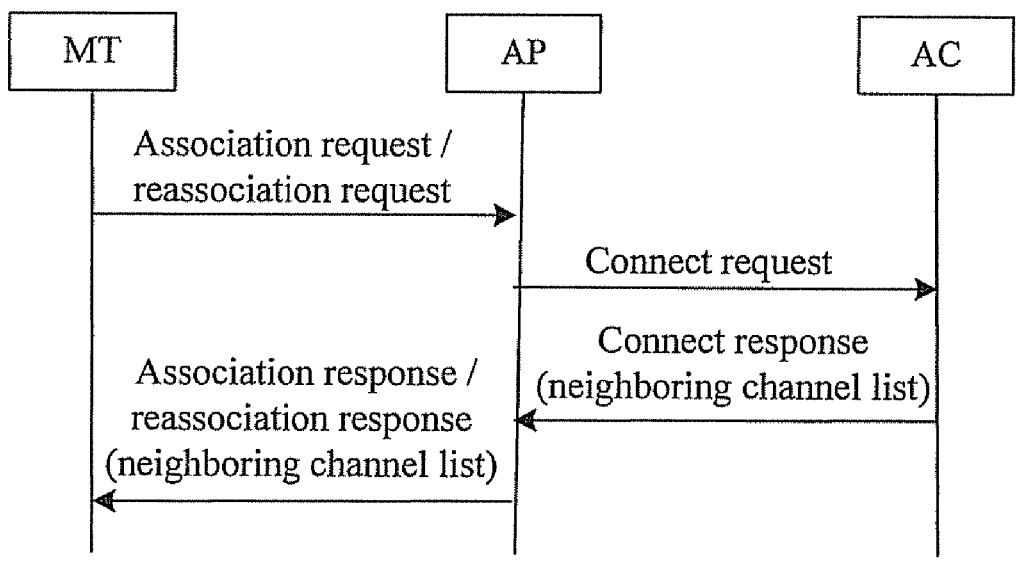
FIG. 5 is a flow chart of an interaction between an AP and an AC in accordance with an embodiment of the present invention.

When the neighboring channel manager is installed in an AC in the centralized system, the interaction between the AC and an AP is shown in FIG. 5, including the following steps.

1) the AP sends a connect request to the AC upon the receipt of the association request or the reassociation request from the MT;

2) the AC sends to the AP a connect response which carries the neighboring channel list generated by the neighboring channel manager when the connection is permitted;

3) the AP forwards the neighboring channel list from the AC to the MT via an association response or a reassociation response.

In the embodiment of the present invention, the MT makes a handoff decision, i.e., determines whether to perform a handoff and the destination channel at AP of a handoff, based on the following three factors:

1) the result of the comparison between the current channel and neighboring channels on the signal intensity, bit error rate, the sensitivity and transmission power on the network infrastructure;

2) the result of the comparison between the current channel and the neighboring channels on the workload;

3) QoS requirements of the services.

It can be seen in the fore-going description that according to the present invention, neighboring information lists are maintained on the network infrastructure and channel monitor data is obtained and transmitted to the MT, so that the time spent by the MT on scanning channels during a handoff is reduced and QoS before and after the handoff is assured as the network infrastructure information is used for assisting in the handoff decision making process.

Obviously, those skilled in the art may make varieties of changes and variations on the solution of the present invention without departing from the spirit and scope thereof. The present invention shall accordingly include the changes and variations in case that such changes and variations fall in the scope as set forth in the Claims of the present invention or in the equivalent techniques thereof.

The invention claimed is:

1. A method for controlling handoff, comprising:
 collecting channel information, by a network infrastructure, wherein the network infrastructure is configured to communicate with a Mobile Terminal via WLAN; and
 transmitting the channel information collected by the network infrastructure to the Mobile Terminal (MT) which makes a handoff decision according to both the channel information collected by the network infrastructure and information collected by the MT;
 wherein the channel information comprises channel monitor data; collecting the channel information comprises:
 monitoring a channel at an Access Points (AP) to obtain the channel monitor data; the channel monitor data comprises at least one of channel workload, receiver sensitivity received by the network infrastructure and transmission power transmitted by the network infrastructure; and the information collected by the MT comprises the signal intensity received by the MT;
 wherein the channel information further comprises a neighboring channel list of the AP that comprises channel information of channels which cover neighboring or overlapping areas of the coverage of the AP; and
 collecting the channel information further comprises: generating the neighboring channel list of the AP that comprises channel information of channels which covers neighboring or overlapping areas of the coverage of the AP.

2. The method of claim 1, wherein transmitting the channel information to the MT comprises:
 transmitting the channel monitor data to the MT via a Probe Response or a Beacon frame.

3. The method of claim 1, wherein transmitting the channel information to the MT comprises:
 transmitting the channel monitor data to the MT via a Probe Response or a Beacon frame; and
 transmitting the neighboring channel list to the MT via an association response or a reassociation response frame.

4. The method of claim 1, wherein the neighboring channel list comprises at least one of channel number, center frequency, normal workload, receiver sensitivity, transmission power and channel malfunction indication.

5. The method of claim 1, wherein making a handoff decision by the MT comprises:
 determining whether to perform a handoff according to the channel information.

6. The method of claim 1, wherein making a handoff decision by the MT further comprises:
 determining a destination network infrastructure in the handoff according to the channel information.

7. A network infrastructure for controlling handoff, the network infrastructure configured to communicate with a Mobile Terminal via WLAN, the network infrastructure comprising:
 a collecting module configured to collect channel information; and
 a transmitting module for transmitting the channel information collected by the collecting module to a Mobile Terminal (MT) which makes a handoff decision according to both the channel information collected by the collecting module and information collected by the MT;
 wherein the collecting module comprises:
 a first collecting unit, configured to monitor a channel at an Access Points (AP) to obtain channel monitor data;
 the transmitting module comprises: a first transmitting unit, configured to transmit the channel monitor data to the MT; and
 the channel monitor data comprises at least one of channel workload, receiver sensitivity received by the network infrastructure and transmission power transmitted by the network infrastructure; and the information collected by the MT comprises the signal intensity received by the MT;
 wherein
 the collecting module further comprises: a second collecting unit, for generating a neighboring channel list; and
 the transmitting module further comprises: a second transmitting unit, for transmitting the neighboring channel list to the MT.

8. A network infrastructure for controlling handoff, the network infrastructure configured to communicate with a Mobile Terminal via WLAN, the network infrastructure comprising:
 an Access Points (AP) configured to obtain channel monitor data by monitoring channels, and transmit the channel monitor data to a Mobile Terminal (MT); and
 an Access Controller (AC), for generating and maintaining a neighboring channel list, transmitting the neighboring channel list to the MT which scans channels in the neighboring channel list and makes a handoff decision according to the channel monitor data obtained by the AP, and information collected by the MT, wherein the neighboring channel list is a neighboring channel list of the AP that comprises channel information of channels which covers neighboring or overlapping areas of the coverage of the AP;
 wherein the channel monitor data comprises at least one of channel workload, receiver sensitivity received by the network infrastructure and transmission power transmitted by the network infrastructure; and the information collected by the MT comprises the signal intensity received by the MT.

9. A mobile terminal for controlling handoff, comprising:
 a receiving module, for receiving channel information collected by a network infrastructure, wherein, the network infrastructure is configured to communicate with the mobile terminal via WLAN; and a handoff module, for making a handoff decision according to both the channel information collected by the network infrastructure and information collected by the mobile terminal;

wherein the channel information comprises channel monitor data; the collecting the channel information comprises: monitoring a channel at an Access Points (AP) to obtain the channel monitor data; the channel monitor data comprises at least one of channel workload, receiver sensitivity received by the network infrastructure and transmission power transmitted by the network infrastructure; and the information collected by the MT comprises the signal intensity received by the MT;

wherein the channel information further comprises a neighboring channel list of the AP that comprises channel information of channels which covers neighboring or overlapping areas of the coverage of the AP.

10. The mobile terminal of claim 9, wherein the handoff module comprises:

a first handoff unit, for determining whether to perform a handoff according to the channel information.

11. The mobile terminal of claim 10, wherein the handoff module further comprises:

a second handoff unit, for determining a destination network infrastructure in the handoff according to the channel information.

12. The mobile terminal of claim 9, wherein the handoff module comprises:

a second handoff unit, for determining a destination network infrastructure in the handoff according to the channel information.

13. The mobile terminal of claim 9, further comprising:

a scanning module, for scanning channels to update the channel information.

\* \* \* \* \*